United States Patent Office 3,415,826
Patented Dec. 10, 1968

3,415,826
TRIS-2-ETHYLAZIRIDINYL-s-TRIAZINE
Joseph Adrian Hoffman, Bridgewater Township, Somerset County, N.J., assignor to American Cyanamid Company, Stamford, Conn., a corporation of Maine
No Drawing. Filed Dec. 14, 1964, Ser. No. 418,293
1 Claim. (Cl. 260—249.6)

ABSTRACT OF THE DISCLOSURE

This invention relates to tris-2-ethylaziridinyl-s-triazine, a compound which has use as a curing agent for fuels composed of carboxy-terminated polybutadiene rubbery copolymers.

---

This invention relates to a new aziridinyl-s-triazine compound and, more particularly, to tris-2-ethylaziridinyl-s-triazine represented by the Formula I:

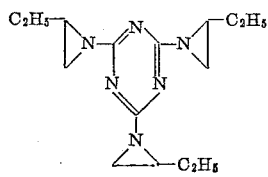

I

This compound has cross-linking properties and is useful as a curing (gelling or solidifying) agent particularly for the gelation of liquid rocket or missile fuel. Solid fuels are generally comprised of a rubbery polymer, an oxidizing agent such as a perchlorate and a highly combustible material such as aluminum.

It is customary to use a cross-linking agent for the purpose of solidifying or gelling propellant fuels originally in the liquid state. Solid fuels are prepared by gelling the fuel components with a suitable curing or gelation agent. In effecting gelation, the fuel mix must be thoroughly blended with the gelling agent to insure product uniformity; then after blending, the liquid mixture is charged into the fuel chamber whereupon it cures (gells or solidifies). Difficulties are often encountered with certain gelling agents which are themselves in solid form at ambient temperatures. To insure thorough blending, the gelation mixture must be heated above the melting point of the curing or gelling agent. This in itself presents hazards if high temperatures are required. More importantly, high temperatures, while being necessary for proper blending, are detrimental to the mixtures in other respects. There are certain requirements which the gelling agent must meet as to reactivity. A certain "pot-life" (or induction period) is necesary to allow the tranfer of the blended liquid fuel mix to the fuel chamber before gelling or solidifying takes place. It is desirable that sufficient time is allowed before gelling so that this transfer may be made and so that no solidification takes place prematurely. In the case of tripropylenemelamine having a melting point of about 104° C., the temperature must be close to 100° C. Triethylenemelamine poses greater difficulties. It has an indefinite melting point, at least above 120° C. Because of its high reactivity, it has a tendency to polymerize to form a solid polymer without apparently going through a liquid stage. Obviously, these temperatures will reduce allowable transfer times by increasing the rate at which reaction occurs.

In view of this state of the art, it is an object of the present invention to provide a gelation agent which is easily blended with pre-solidified solid fuel mixes at slightly elevated temperatures. It is a further object to provide a gelable fuel mix which is capable of remaining in a liquid state, prior to gelation, for a sufficiently long time to permit transfer from the blending vessel to the fuel chamber.

These and other objects are accomplished by the use of the compound of this invention. It is liquid at slightly above room temperature and thus may easily be blended with the fuel mix without heating above about 50° C.

In addition, it is of such reactivity that the high resultant "pot-life" permits easy transfer to a fuel chamber substantially before gelation starts.

The new compound of the invention is conveniently prepared by a conventional type reaction involving the treatment of cyanuric chloride with 2-ethylaziridine (2-ethyl ethyleneimine).

The invention is further illustrated by the examples which follow. Parts are on a weight basis.

Example 1

A mixture of 1.84 grams of cyanuric chloride in 10 ml. of benzene was cooled in an ice bath with stirring; and to it was added a solution of 2.5 grams of 2-ethyl-aziridine and 3.2 grams of triethylamine in 5 ml. of benzene. When the addition was complete, the mixture was heated at 40° C. until the reaction was complete. The triethylamine hydrochloride which separated was isolated by filtration and the solvent was removed from the filtrate by distillation to give the product, tris-2-ethylaziridinyl-s-triazine, as a pale yellow liquid which solidifies on cooling to room temperature slightly thereabove.

Example 2

This example shows the use of the compound of Example 1 as a gelling agent for a fuel mixture composed of a carboxy-terminated polybutadiene rubbery polymer, ammonium perchlorate and aluminum powder. The polymer itself is prepared by conventional polymerization of 1,3-butadiene to give a product with a molecular weight of about 3800, which product is quenched with carbon dioxide to provide carboxy termination.

A mixture of one part of the compound of Example 1 and 16 parts of carboxy-terminated polybutadiene is heated to 50° C. and thoroughly blended by suitable stirring means. To the blend is added 75 parts of ammonium perchlorate and 8 parts of aluminum powder. The resulting fuel mix is blended thoroughly and then put into the fuel chamber of a rocket motor whereupon it cures, solidifying to a hard rubber-like material.

A fuel mixture is prepared as above, substituting an equivalent amount of tris-2-methylaziridinyl-s-triazine for the compound of Example 1. This mixture sets up to a rubber-like material in only one-half the time.

I claim:
1. A compound of the formula:

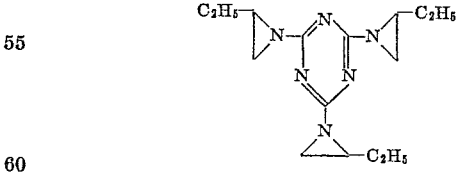

References Cited

UNITED STATES PATENTS 2,620,315   12/1952   Lundberg _____ 260—249.6 XR
3,147,161    9/1964   Abere et al.

HENRY R. JILES, Primary Examiner.
J. M. FORD, Assistant Examiner.

U.S. Cl. X.R.
44—7, 63